Aug. 25, 1953     C. G. TUBBS     2,649,723
SELF-SHARPENING ROTARY PLOW
Filed March 22, 1947
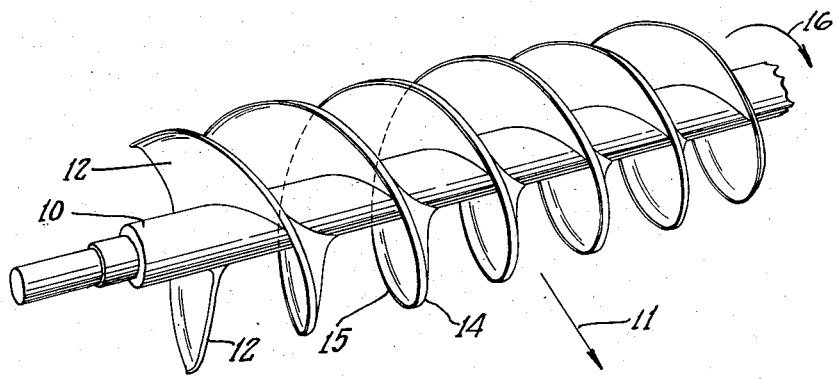
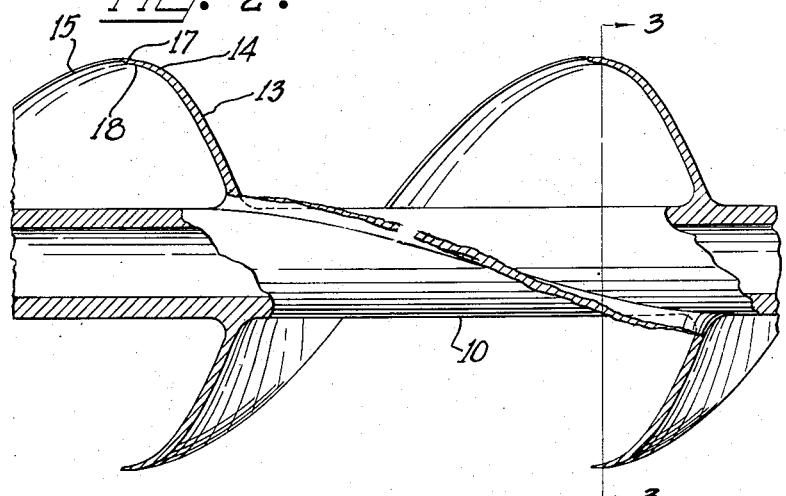
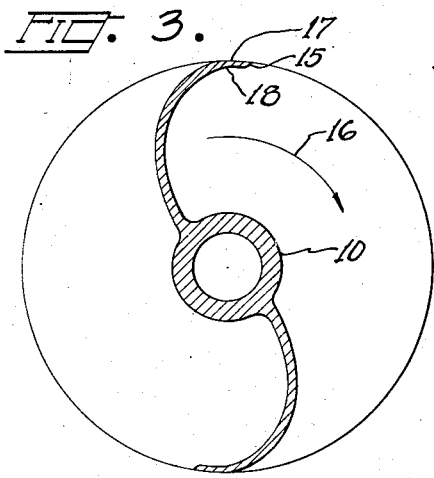
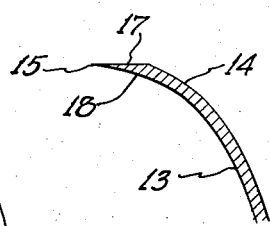
INVENTOR
CLARENCE G. TUBBS
BY Cook and Schermerhorn
ATTORNEY Patented Aug. 25, 1953

2,649,723

UNITED STATES PATENT OFFICE 2,649,723

SELF-SHARPENING ROTARY PLOW

Clarence G. Tubbs, Pendleton, Oreg.

Application March 22, 1947, Serial No. 736,574

4 Claims. (Cl. 97—219)

This invention relates to a rotary plow to be hitched to a tractor or the like and driven by a power take-off from the tractor engine.

Power driven rotary plows have been found to be very effective and useful for many different kinds of work as long as the cutting blades are in new and sharp condition. In addition to a primary utility to plow the soil, this type of implement is well suited for use as a cultivator to eradicate weeds, as a soil surface mulcher to conserve moisture, as a tiller to properly and completely prepare a seed bed with a minimum of time and labor, as a digester or reducer of fertilizers, green cover crops, stubble, cotton brush, and the like, to build up the mineral strength or humus content of the soil, and as an implement for erosion control by contour plowing. In contour plowing the earth may be thrown to the downhill side of the plow to raise a barrier to stop surface run-off whereby surface water may be held on a hillside until it has time to soak into the ground.

In general, the rotary plow may be used as an all purpose implement to till and aerate the soil and to chop up sod, grass, weeds, stubble, stalks, brush and many other materials which, if plowed under with the conventional plowshare, would disintegrate slowly and produce large air pockets and be a hindrance to future operations with other implements. Grain stubble and corn stalks of considerable height are chopped into short lengths and individually dispersed through the soil by a sharp rotary plow so that the soil is placed in contact with the surface of each piece of such material to hasten its disintegration and enrichment of the soil. Long stubble and stalks are turned over in a mass by the conventional moldboard so that most of the plant material is not left in direct contact with the enveloping soil, and in this condition it may resist disintegration for several years, in the meanwhile preventing the rising of subsurface moisture to the roots of crops planted in the overlying soil and interfering with harrowing and other working of the soil. However, in spite of the general utility and particular advantages of the rotary plow, and in spite of the fact that a number of different forms of rotary plow have heretofore been proposed, they have not been generally accepted in agriculture.

Rotary plows heretofore developed and tested have been generally effective and satisfactory while in new condition, but the designs have been such that a slight amount of wear takes the original sharp edge off the blades and quickly renders the plow ineffective for satisfactory operation. In order to free the soil from the blades by centrifugal force, the blades cannot be inclined to make a small angle with the shaft to which they are attached, as viewed in longitudinal section. When the blades are set at a small oblique angle on the shaft, moist soil tends to pack between the blades and form a solid roller. But when the blades are set at a large oblique angle the cutting edges wear to form a blunt bevel at the same angle whereupon they cease to cut and merely have a scraping action. The plow is then inoperative until the blades are resharpened. Sharpening such a plow at frequent intervals after relatively short periods of use entails so much expense and delay at the time the plow is most urgently needed as to render known types of rotary plows impractical as a substitute for the conventional implements.

The general object of the present invention is, therefore, to provide a rotary plow which will retain the desirable characteristics and advantages of the best forms of rotary plows heretofore proposed for a sufficient length of continuous use to make it a practical implement. Another object is to provide a rotary plow having improved axial cutting action. Another object is to provide a rotary plow cutter in which the wear from normal use operates to keep the cutter blades sharpened until a considerable portion of the blades has worn away.

The objects of the invention are accomplished by imparting a compound curvature to the blades in longitudinal section. It is generally preferred to provide two spiral blades on the rotary cutter shaft so that the lead of each of the blades is equal to twice the pitch or blade interval along the shaft. Each of these blades extends from the shaft at a large oblique angle which varies with the radial distance from the shaft to form a long radius curvature. The two blades are identically shaped so as to be equidistant and parallel to facilitate the throwing out of the earth by centrifugal force when the cutter rotates. If the blades form pockets at their bases at a small angle with the shaft as viewed in longitudinal section, soil under certain conditions will tend to pack therein and will not respond to centrifugal force. In the practice of the present invention it is desired to maintain wide and clear openings between the blades throughout the greater part of the radial length of the blades, although the shape of the rims of the blades is modified in a manner which will be presently pointed out. This is permissible without interfering with the soil freeing characteristics of the plow as a whole because of the greater centrifugal force acting on the soil at the rim of the blade. At the base of the blades near the shaft the centrifugal force is relatively less, and so the blades should stand out from the shaft at a greater angle than in their rim portions most remote from the shaft. The shape of the blades may, of course, be modified to a greater or lesser extent for working different kinds of soils, depending on the texture and dampness of the soil, but it is obviously desirable to provide a blade shape which will function satisfactorily in any soil which could be plowed with an ordinary plowshare.

The modification of the shape of the rim portion of each blade consists in curving to a short radius, or cupping, the outer margin of the blade in an axial direction, so that the cutting edge will be directed predominantly axially, rather than radially, of the cutter. This compound curvature produces an approximate elliptical shape in longitudinal cross section, with the curvature increasing from the shaft to the cutting edge. Rotation of the cutter shaft as it is mounted parallel with the ground surface causes the series of cutting edges on the bottom and leading sides of the cutter to advance axially and hence cut the soil with a slicing motion in a cylindrical pattern. The present plow is intended to be mounted so that the line of draft is approximately perpendicular to the shaft, and it is intended to be rotated in the direction of roll but considerably faster than the translational ground speed of the plow. The plow may be mounted and driven in other ways, however, while still retaining the advantages of the axially directed cutting edge, and the cutter blades may have either a left hand or right hand spiral, provided the rotation is in the proper direction to advance the cutting edges into the soil.

It has been the experience with previous cutter blades that the abrasion on peripheral portions of the blades resulting from rotating ground contact has quickly ground off the sharpened edges of the blades, so that after very little use they are capable only of a scraping action rather than a cutting action upon the soil. When conventional rotary cutter blades become dulled on their edges, they are effective as a screw conveyor to impart axial movement to loose soil and material, but they are ineffective to cut into the soil or to cut stubble, cornstalks, or other woody material that could easily be chopped into short lengths by sharp blades. Dull blades further hinder the plowing operation in that they tend to climb out of the ground rather than cut through it, and in that they impose a greater drag on the tractor and higher stresses in the blades and shaft than sharp blades. Stresses which tend to bend the blade in the reverse direction and to cause pieces to be broken from the cutting edge are increased in proportion to the dullness of the blade. The scraping action of a dull blade encounters more resistance in the soil than the cutting action of a sharp blade.

In the practice of the present invention, the rims of the blades are curved axially to utilize the abrasive action of the soil to sharpen, rather than to dull the blades. As the revolving cutter is pressed downwardly and forwardly through the soil while being caused to rotate considerably faster than its translational ground speed, the principal abrading forces are exerted radially of the cutter toward the shaft. Hence, the rims of the blades are ground thinner on a small angle bevel which maintains them in sharpened condition in an axial direction. The desired sharpening action results from the fact that the rotational velocity of the blade rim is considerably greater than the axial travel of the screw action of the blade. As metal is worn away from the outer side of the blade rim, the bevel is maintained at a varying angle until the rim portion of the blade is entirely worn off. During this period of use the blade maintains its sharp cutting edge for cutting in an axial direction, although the rim becomes progressively narrower, just as a knife blade becomes narrower after repeated sharpening. After the cupped rim portion has been entirely worn away, the remaining portion of the blade may still be used in soil free of hard clods, stubble, stalks, or other woody material, which could be worked satisfactorily with a conventional rotary cutter.

A preferred embodiment of the invention is illustrated in the accompanying drawings, in which:

Figure 1 is a fragmentary perspective view of the rotary plow cutter;

Figure 2 is a fragmentary view of the cutter, partly in elevation and partly in section;

Figure 3 is a cross sectional view of the cutter taken on the line 3—3 of Figure 2; and Figure 4 is an enlarged view of the rim for cutting blade showing the self-sharpening action.

The numeral 10 designates the shaft of the cutter which is designed to be mounted in bearings in a frame behind a tractor or other vehicle substantially at right angles to the line of draft indicated by the arrow 11. Two spiral cutter blades 12 are attached to the shaft 10, as by welding, each of these blades having a body portion 13 of substantial radial width in the approximate form of a portion of an ellipse. In longitudinal section the body portion of the blade is of long radius curvature and inclined to the shaft at an angle less than 90 degrees, as shown in Figure 2. On the periphery of this portion of the blade is a cutting rim 14 which is deflected or curved to a shorter radius in an axial direction to present an axial cutting edge 15. The body portion 13 and rim 14 therefore have a compound curvature following nearly one fourth of an elliptical curve. The shaft is power rotated to advance the cutting edge 15 through the soil and, obviously, the direction of this rotation is determined by the direction of twist of the spiral blades on the shaft. In the present embodiment the blades spiral with a right hand twist, hence they must rotate in the direction of the arrow 16 in order to make the cutting edges effective.

Thus, with reference to Figure 1, the cutting edges on the leading or near side of the cutter slice downwardly into the soil and advance axially to the left. The speed of rotation of the cutter is preferably considerably greater than its translational ground speed. The direction of rotation is determined by the direction of the spiral of the cutter blades, so that a particular cutter blade can never be driven in reverse, but it is within the scope of the invention to reverse the direction of draft so that the translational movement of the cutter will be opposite to the direction of the arrow 11. In such case the cutting edges 15 would slice upwardly through the soil on the back side of the cutter as viewed in Figure 1, and, at the same time, move axially toward the left. The direction of draft would then be counter to the direction of roll of the cutter, whereby a slower cutter speed might be used.

As the cutter is pressed down into the soil and pulled forwardly in its line of draft substantially at right angles to the direction of its axis, the resistance offered by the soil produces considerable abrasive wear on the outermost parts of the revolving blades. When the sharpened edges are formed in the conventional manner, instead of upon an axially turned rim, this wear occurs directly on the edge of the blade, as viewed in Figure 2, in such a manner as to immediately dull and wear away the blade. As a result of such wear, any initial sharpening of the blade is only temporary because relatively little use produces a rapid blunting effect. However, by turning the cutting rim in an axial direction to approach tangency with an imaginary cylindrical surface concentric with the shaft, the peripheral wear which acts primarily radially inwardly toward the shaft is exerted, not on the extreme cutting edge, but upon the outer lateral surface 17 to form a bevel thereon with respect to the inside surface 18 and keep the edge sharp for axial cutting. The radial pressure of the soil against the blades as the cutter is moved through the earth tends to grind the wearing surface 17 in the shape of a cylinder concentric with the shaft. The curvature of the inside surface 18 is such that the cylindrical surface 17 always forms therewith a sharp bevel to maintain the sharpness of the cutting edge as the rim 14 wears back toward the base of the blade. As the rim 14 wears back, the bevel surface 17 makes a less acute angle with the inner rim surface 18, but a good cutting edge is nevertheless maintained until all of the curved rim has been worn away.

Since only the rims of the blades make a small angle with the shaft, they do not offer any material interference with the ability of the cutter to relieve itself of soil by centrifugal force. Inwardly of the rims 14 the portions 13 of the blades are relatively open and parallel, as shown in Figure 2, whereby the soil between the spiral convolutions of the blades is allowed an easy egress so that it will not tend to pack around the shaft. A slight curvature is desired in this part of the blade insofar as it is not sufficient to retain the soil at the rotating speed desired in operation. The curved rim 14 is necessary because, if the angle between the portion 13 and the shaft were made sufficiently small so that the cylindrical wearing surface 17 would form a sharp bevel with the inner surface of the blade, the angle between the blade and shaft would be too small to permit the release of the soil by centrifugal force, and the cutter would pack with soil and become a solid roller. The minimum angle between the blade and the shaft is thus limited by the ability of the cutter to clear itself of soil.

The compound curvature of the blades is effective to neutralize some of the stresses imposed thereon and also to stiffen both the blades and the shaft to which they are attached. The ground reaction forces from the draft of the tractor are distributed over a considerable part of the arched back side of the blade and produce an axial component in opposition to the end thrust of the screw action of the blade. By maintaining sharp cutting edges the maximum benefit is derived from this component to reduce the bending stresses on the blades, and in particular to reduce the vibration stresses from operating in a heterogeneous material. The compound curvature of the arch also imparts the greatest stiffness and strength for a given blade thickness to resist these various stresses. With this shape of blade fatigue failure is minimized and the possibility of turning back a rim is substantially eliminated.

In operation the soil is transported axially a short distance and then discharged rearwardly and upwardly in a divided condition with the clods, stalks and other woody material sliced into small pieces, and satisfactory performance is maintained for the life of the cutter.

Having now described my invention and in what manner the same may be used, what I claim as new and desire to protect by Letters Patent is:

1. A spirally shaped cutter blade for a tillage implement, said blade being welded to and extending substantially from end to end of a drive shaft extending transversely of the line of draft of said implement, said blade extending from its longitudinal axis in a substantially radial direction and having its radial portion of long radius curvature relative to the width of the blade, said blade having a cutting rim curved to a shorter radius in an axial direction and approaching tangency with an imaginary cylindrical surface concentric with the axis of the blade, whereby peripheral wear acting radially inwardly of the blade forms a bevel with the inner surface of the rim and maintains a sharp cutting edge, said shaft when driven imparting a rolling motion to said blade in the direction of draft whereby the cutting edges on the leading side of the blade slice downwardly into the soil.

2. A tillage implement as defined in claim 1 in which there are two spirally shaped cutter blades of the same diameter and pitch and equally spaced from each other on a common axis.

3. A spirally shaped cutter blade for a tillage implement, said blade being welded to and extending substantially from end to end of a drive shaft extending transversely of the line of draft of said implement, said blade extending in a substantially radial direction from its longitudinal axis to its rim portion, and a cutting rim on said blade curved to a short radius relative to the width of the blade with the cutting edge directed axially of the blade, whereby the blade stands out from its axis at a greater angle than does its rim portion.

4. A spirally shaped cutter blade for a tillage implement, said blade being welded to and extending substantially from end to end of a drive shaft extending transversely of the line of draft of said implement, said blade having a cutting rim on its outer periphery and having the approximate shape of a portion of an elliptical curve wherein any section thereof in a longitudinal plane through its axis is of long radius curvature relative to the width of the blade for that portion of the blade from said axis to its rim portion, said cutting rim being axially curved to a shorter axis in a direction substantially parallel with the axis of the blade.

CLARENCE G. TUBBS.

References Cited in the file of this patent

UNITED STATES PATENTS

| Number | Name | Date |
|---|---|---|
| 158,482 | Foye | Jan. 5, 1875 |
| 2,342,032 | Bagan | Feb. 15, 1944 |
| 2,373,080 | Norton | Apr. 3, 1945 |
| 2,410,003 | Bagan | Oct. 29, 1946 |

FOREIGN PATENTS

| Number | Country | Date |
|---|---|---|
| 2,097 | Great Britain | 1857 |
| 107,869 | Australia | June 30, 1939 |